(12) United States Patent  
Sugita

(10) Patent No.: US 8,736,987 B2  
(45) Date of Patent: May 27, 2014

(54) LENS BARREL AND CAMERA SYSTEM

(75) Inventor: Jun Sugita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 12/969,296

(22) Filed: Dec. 15, 2010

(65) Prior Publication Data

US 2011/0149422 A1 Jun. 23, 2011

(30) Foreign Application Priority Data

Dec. 21, 2009 (JP) ................. 2009-289724

(51) Int. Cl.
*G02B 7/02* (2006.01)
*G02B 7/00* (2006.01)
*G02B 7/04* (2006.01)

(52) U.S. Cl.
CPC ............... *G02B 7/023* (2013.01); *G02B 7/004* (2013.01); *G02B 7/04* (2013.01)
USPC ............................ 359/822; 359/823; 359/830

(58) Field of Classification Search
USPC .................... 359/819, 822–826, 830
See application file for complete search history.

(56) References Cited

U.S. PATENT DOCUMENTS 6,008,958 A * 12/1999 Ishikawa et al. ............ 359/824
6,094,538 A * 7/2000 Asayama et al. ............ 396/137

FOREIGN PATENT DOCUMENTS

| JP | 02-253214 A | 10/1990 |
| JP | 02253214 A * | 10/1990 |
| JP | 08-114739 A | 5/1996 |

* cited by examiner

*Primary Examiner* — Mahidere Sahle
(74) *Attorney, Agent, or Firm* — Canon USA, Inc. IP Division

(57) ABSTRACT

A lens barrel includes an oscillatory wave motor which drives a lens; a manual connection ring which is operated manually to cause the lens to move along an optical axis; a slip ring which is in contact with the manual connection ring; a roller which is in contact with the slip ring and with the oscillatory wave motor; and a roller support ring which supports the roller. The slip ring is structured such that frictional resistance on a contact surface between the manual connection ring and the slip ring is smaller than frictional resistance on a contact surface between the roller and the slip ring.

16 Claims, 4 Drawing Sheets

LENS BARREL AND CAMERA SYSTEM

BACKGROUND OF THE INVENTION

1. Field of the Invention

The present invention relates to a lens barrel in which lenses can be driven by an annular oscillatory wave motor disposed coaxially with an optical axis and in which lenses can be operated manually with a manual ring.

2. Description of the Related Art

Japanese Patent Laid-Open No. 02-253214 discloses a lens barrel in which lenses can be driven by an oscillatory wave motor with a ring having rollers rotatable about axes disposed at radial positions thereof (hereinafter, referred to as a roller support ring) and in which lenses can be operated manually with a manual operation ring.

With the structure disclosed in Japanese Patent Laid-Open No. 02-253214, when a user tries to continue to manually operate the manual operation ring after the roller support ring is brought into contact with an operating end, a portion with the smallest frictional resistance slips against frictional force. Usually, the portion slips at a place between the manual operation ring and the rollers, between the rollers and the oscillatory wave motor or, though in rare cases, between a rotor and a stator in the oscillatory wave motor. The roller support ring often has a complicated shape and is thus formed by resin molding. When a slippage of the rollers which are supported by shafts that are made of resin and are thus easily elastically deformable occurs, deformation of the shaft and friction may be caused alternately and repeatedly. This phenomenon may cause undesirable vibration and unusual noise.

The present invention reduces slippages between a roller and a member in contact with the roller when an operator tries to continue a manual operation after a roller support ring is brought into contact with an operating end.

SUMMARY OF THE INVENTION

An exemplary lens barrel according to the present invention includes: an annular oscillatory wave motor which drives a lens; a manual ring which is rotatable about the optical axis of the lens and is operated manually to move the lens along the optical axis; a slip ring which is rotatable about the optical axis and is in contact with the manual ring; a roller which is rotatable about an axis in a radial direction perpendicular to the optical axis and is in contact with the slip ring and with the oscillatory wave motor; a roller support ring which supports the roller and is rotatable about the optical axis; and a pressurizer which presses the oscillatory wave motor against the roller. The slip ring is structured such that frictional resistance on a contact surface between the manual ring and the slip ring is smaller than frictional resistance on a contact surface between the roller and the slip ring.

Another exemplary lens barrel according to the present invention includes: an annular oscillatory wave motor which drives a lens along an optical axis; a manual ring which is rotatable about the optical axis of the lens and is operated manually to move the lens along the optical axis; a slip ring which is rotatable about the optical axis and is in contact with the manual ring; a roller which is rotatable about an axis in a radial direction perpendicular to the optical axis and is in contact with the slip ring and with the oscillatory wave motor; a roller support ring which supports the roller and is rotatable about the optical axis; and a pressurizer which presses the roller and the slip ring together by pressing the oscillatory wave motor against the roller. A contact surface between the manual ring and the slip ring and a contact surface between the roller and the slip ring are adapted such that a slippage might occur between the manual ring and the slip ring before a slippage occurring between the roller and the slip ring when the manual ring receives force in a predetermined rotational direction even after it is rotated in the predetermined rotational direction and is brought into contact with an end of a rotational area.

Further features of the present invention will become apparent from the following description of an exemplary embodiment with reference to the attached drawings.

DESCRIPTION OF THE EMBODIMENTS

Hereinafter, a lens barrel according to an embodiment of the present invention will be described with reference to the drawings.

The lens barrel according to the present embodiment incorporates an annular oscillatory wave motor disposed coaxially with an optical axis of lenses and includes a manual operation ring which enables a manual operation.

Figure 1:
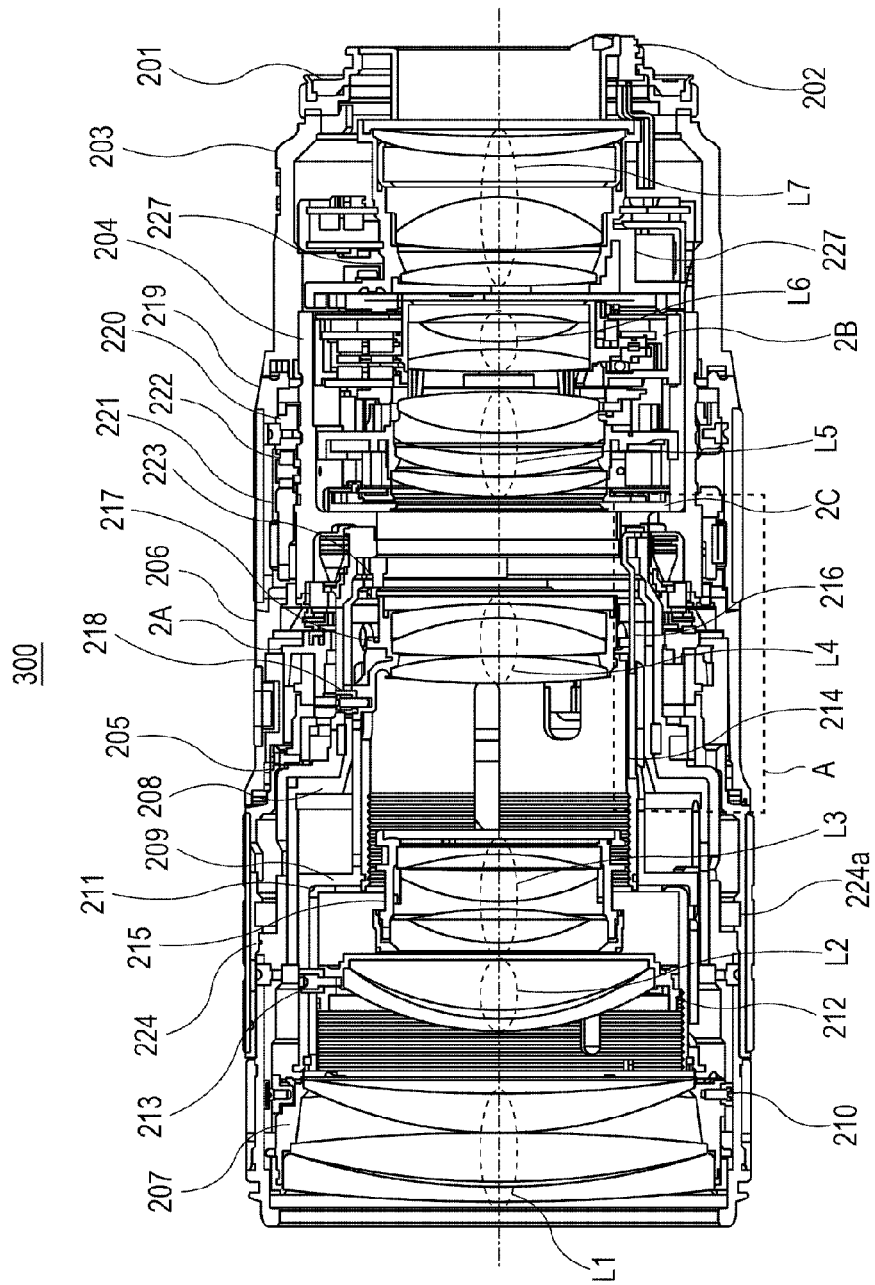
FIG. 1 is a sectional view of a lens barrel to which the present invention is applied.
Figure 2:
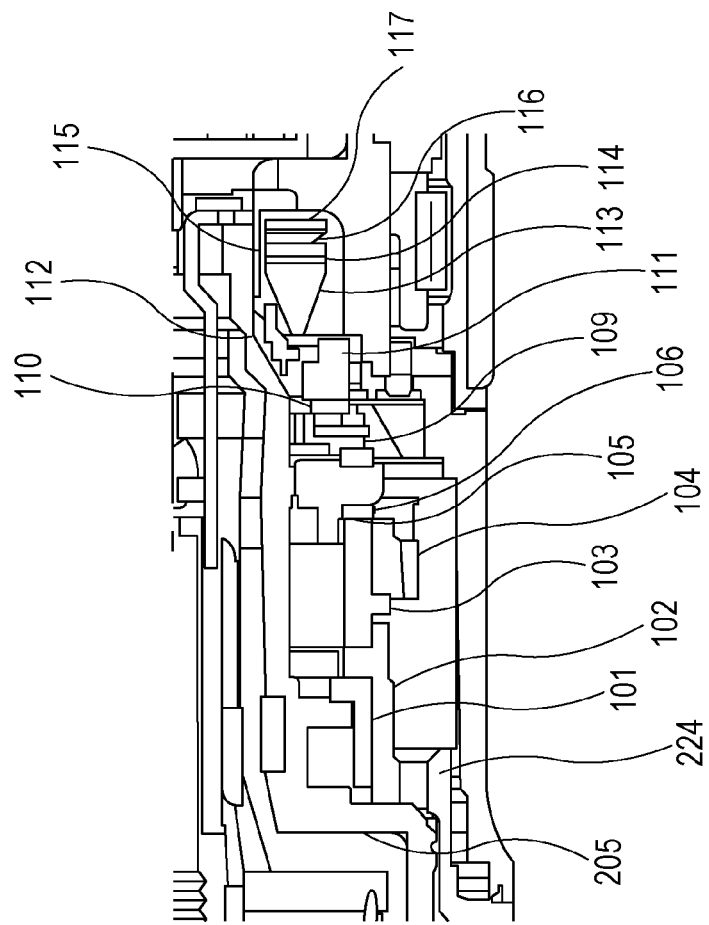
FIG. 2 is a partially enlarged sectional view of a focus driving unit.
Figure 3:
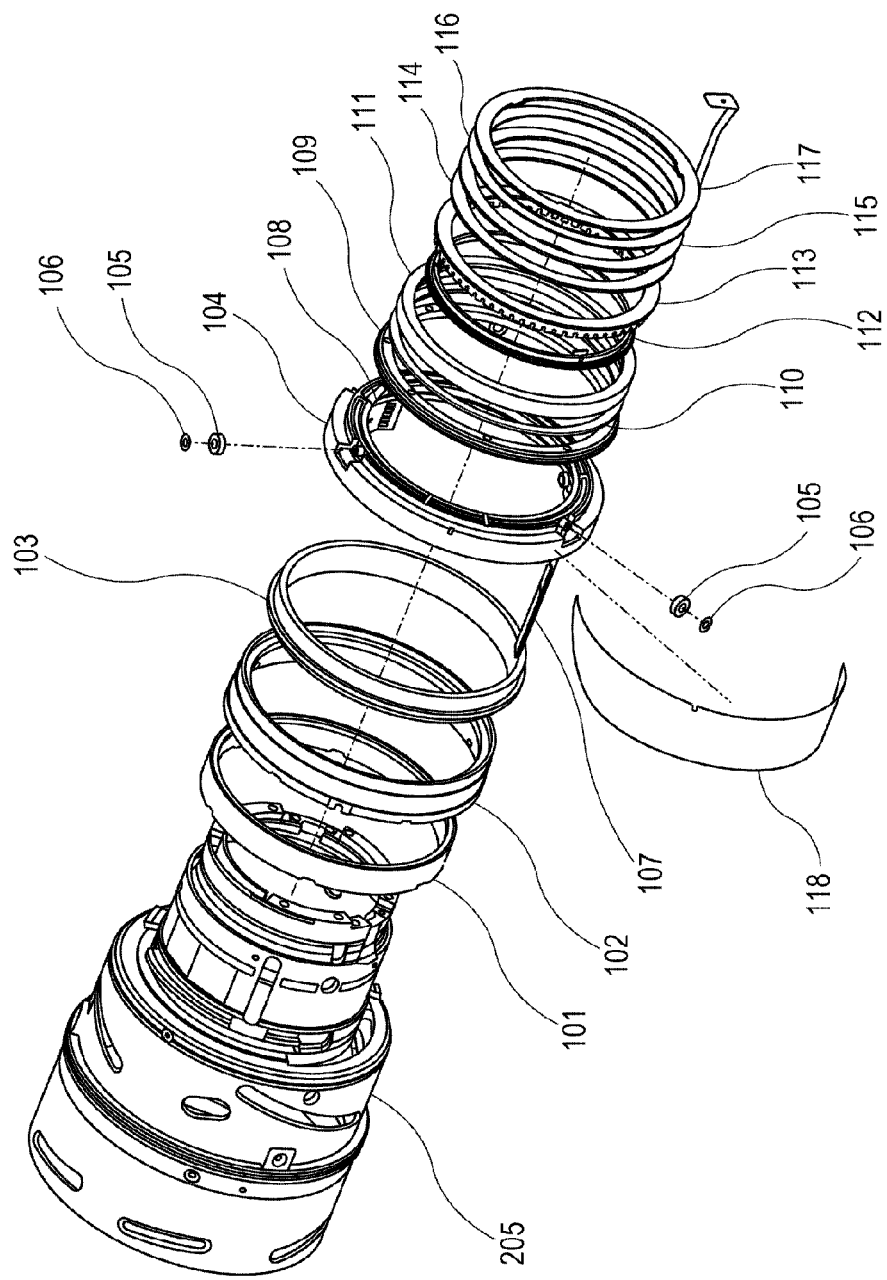
FIG. 3 is an exploded perspective view of the focus driving unit.
Figure 4:
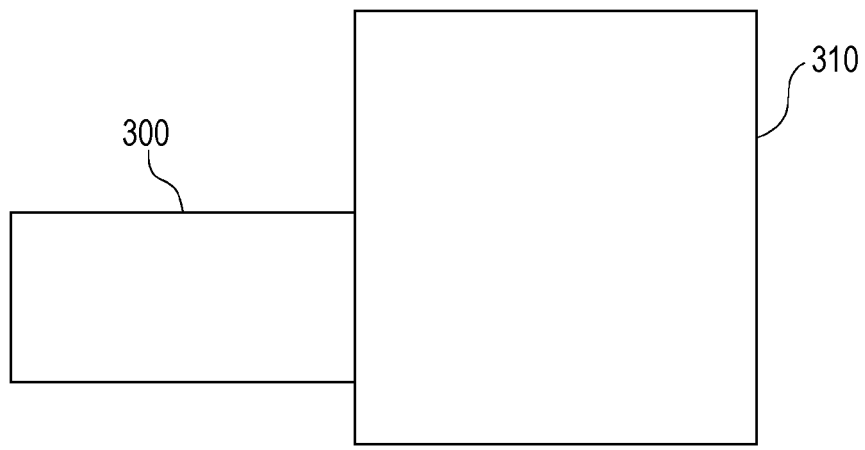
FIG. 4 illustrates a camera system.

FIG. 1 is a sectional view of the lens barrel according to the present embodiment. FIG. 2 is a partially enlarged view of FIG. 1 (i.e., in a broken line frame A) illustrating a focus driving unit included in the lens barrel. FIG. 3 is an exploded perspective view of the focus driving unit. FIG. 4 illustrates a camera system constituted by the lens barrel and a camera body.

A lens barrel 300 according to the present embodiment includes a mount 201 for mounting on a camera body 310. The mount 201 includes a connector 202 for the communication between the camera body 310 and the lens barrel 300.

The mount 201 is attached with screws to a fixed lens barrel 203. The fixed lens barrel 203 is fixed with screws to an intermediate barrel 204. The intermediate barrel 204 is attached with screws to a guide barrel 205. An exterior barrel 206 is attached with screws to the intermediate barrel 204. The fixed lens barrel 203, the intermediate barrel 204 and the guide barrel 205 are annular members disposed coaxially with the optical axis.

A first lens barrel 207 which supports a first lens unit L1 is fit into and supported by the guide barrel 205 at the side closest to an object. A cam follower A 210 which is fit into a cam slot of the guide barrel 205 is fixed with screws to the first lens barrel 207. An optical adjustment during manufacture of the lens barrel 300 can be made via the cam follower A 210 by moving the first lens barrel 207 back and forth within the cam slot of the guide barrel 205.

A cam barrel 208 is fit into the guide barrel 205. A cam follower B (not illustrated) is fixed with screws to the cam barrel 208. The cam follower B is fit into a slot formed inside the guide barrel 205 and rotates at a fixed position about the optical axis along an inner diameter of the guide barrel 205. A sub cam barrel 209 is fit into the cam barrel 208. A cam follower C (not illustrated) is fixed with screws to the sub cam barrel 209. The cam follower C is made to pass through an in-line slot formed in the cam barrel 208 and in a sub cam slot formed in the guide barrel 205. The sub cam barrel 209 is moved back and forth along the inner diameter of the cam barrel 208 as the cam barrel 208 rotates.

A second in-line guide barrel 211 is fit into the sub cam barrel 209. The second in-line guide barrel 211 is fixed to the sub cam barrel 209 through a bayonet engagement and is capable of rotating at a fixed position about the optical axis within the sub cam barrel 209. The second in-line guide barrel 211 includes an in-line slot and a slot in which a focus key 107 of a focus driving unit 2A is fit.

A second lens barrel 212 which supports a second lens unit L2 is fit into the second in-line guide barrel 211. A cam follower D 213 is fixed with screws to the second lens barrel 212. The cam follower D 213 is made to pass through a focus cam slot formed in the sub cam barrel 209 and through an in-line slot of the second in-line guide barrel 211. A third in-line guide barrel 214 is fit into the sub cam barrel 209. The third in-line guide barrel 214 is fixed to the sub cam barrel 209 through a bayonet engagement and is capable of rotating at a fixed position about the optical axis within the sub cam barrel 209. The third in-line guide barrel 214 includes an in-line slot and a slot into which an in-line guide key 216 fixed to the guide barrel 205 is fit.

A third lens barrel 215 which supports a third lens unit L3 is fit into the third in-line guide barrel 214. A cam follower E (not illustrated) is fixed with screws to the third lens barrel 215. The cam follower E is made to pass through a zoom cam slot formed in the sub cam barrel 209 and through an in-line slot of the third in-line guide barrel 214.

A cam follower F 218 is fixed with screws to a fourth lens barrel 217 which supports a fourth lens unit L4. The cam follower F 218 is made to pass through a fourth cam slot formed in the cam barrel 208 and through an in-line slot formed in the guide barrel 205.

A zoom operation ring 219, a gear ring A 220 engaging with screws with the zoom operation ring 219 and a gear ring B 221 are fit into and supported by the intermediate barrel 204. The gear ring A 220 and the gear ring B 221 rotate at fixed positions about the optical axis along an outer diameter of the intermediate barrel 204. A gear unit 222 which rolls between the gear ring A 220 and the gear ring B 221 is fixed with screws to the intermediate barrel 204. A zoom lever 223 is fixed with screws to the gear ring B 221 at one end and fit into the cam barrel 208 at the other end.

A focus ring 224 is fit onto the guide barrel 205. A cam follower G (not illustrated) which is fixed with screws to the guide barrel 205 is fit into a slot 224a formed inside the focus ring 224. The focus ring 224 is rotated at a fixed position about the optical axis along an outer diameter of the guide barrel 205. The focus ring 224 engages with a manual connection ring 102 provided inside the focus driving unit 2A. The manual connection ring 102 transfers torque from the focus ring 224 to the focus driving unit 2A. An end surface of the manual connection ring 102 along the optical axis is in contact with the guide barrel 205 and is positioned along the optical axis by the guide barrel 205. Although the manual connection ring 102 and the focus ring 224 are separately provided in the present embodiment, these components may be formed integrally with each other. From this reason, the manual connection ring 102 and the focus ring 224 are collectively referred to as "a manual ring."

The focus driving unit 2A is formed by a differential operating system which will be described later and torque output from the differential operating system is transferred to the second in-line guide barrel 211 via the focus key 107. The focus key 107 and the in-line slot of the second in-line guide barrel 211 are fit together.

An electrically operated aperture unit 2C is provided at an imaging surface side of the fourth lens barrel 217. At an imaging surface side of the electrically operated aperture unit 2C, a fifth lens barrel 225 which supports a fifth lens unit L5 is fit into the intermediate barrel 204 and is supported at a fixed position by a cam follower H (not illustrated).

A sixth lens unit L6 is an image stabilization lens unit. The position of the imaging surface is changed as the sixth lens unit L6 is moved along a face perpendicular to the optical axis. An image stabilization lens unit 2B includes a sixth lens barrel 226 which supports the sixth lens unit L6, two pairs of magnets for driving the sixth lens unit L6 in two axial directions, a coil, a lens position detecting element and a drive controlling substrate which controls these components. The image stabilization lens unit 2B is fit into the intermediate barrel 204 and is supported at a fixed position by a cam follower I (not illustrated).

A seventh lens barrel 227 which supports a seventh lens unit L7 is fixed with screws to the intermediate barrel 204 at an end surface of the imaging surface side. A gyro sensor which detects angular velocity along the two axes and two substrates which control the lens barrel are attached to the seventh lens barrel 227.

The lens barrel includes a plurality of devices which output states of the lenses. The devices output, to the camera body, focal distance information, focusing unit position information, focus displacement information, information on aperture opening, information on an image stabilization lens position, lens angular velocity information, and other information.

Next, a structure of the focus driving unit 2A will be described in detail.

As illustrated in FIGS. 1 to 3, the guide barrel 205 also functions as a base member of the focus driving unit. The guide barrel 205 supports a collar member 101 which is provided to reduce frictional resistance. The manual connection ring 102 is attached in contact with the collar member 101. A slip ring 103 is disposed in contact with the manual connection ring 102. Rollers 105 are disposed in contact with the slip ring 103 at three radial positions perpendicular to the optical axis of the lens barrel. The manual connection ring 102 and the slip ring 103 are rotatable about the optical axis as will be described in detail later.

Contact surfaces between the manual connection ring 102 and the slip ring 103 and between the slip ring 103 and the rollers 105 each have surface roughness determined such that frictional resistance between the manual connection ring 102 and the slip ring 103 might be smaller than that between the slip ring 103 and the rollers 105.

The rollers 105 are supported to rotate about support shafts disposed at three radial positions on a circumference of a roller support ring 104. Each of the rollers 105 is retained on its shaft with a washer 106. The focus key 107 is fixed to the roller support ring 104 in engagement with the second in-line guide barrel 211. A brush member 108 is attached to the roller support ring 104 at a position corresponding to a flexible printed wiring board (not illustrated) attached to the guide barrel 205 and provided with a printed gray code pattern. The flexible printed wiring board and the brush member 108 constitute a position encoder. As the brush member 108 slides on the flexible printed wiring board, a rotational position of the roller support ring 104 is detected. The detected rotational position of the roller support ring 104 is used for the control of a focusing operation. A distance scale sheet 118 having a printed scale corresponding to a rotation angle is attached to an outer circumference of the roller support ring 104. A rotational area of the roller support ring 104 with respect to the guide barrel 205 is restricted by an unillustrated rotation control portion such that the roller support ring 104 is moved within an operation area of the second lens unit L2 which is a focusing unit.

A connection ring 109 is disposed in contact with the slip ring 103 and with the rollers 105, which are in contact with the slip ring 103, at the imaging surface side thereof. An annular oscillatory wave motor is disposed coaxially with the optical axis of the lenses at the imaging surface side of the connection ring 109 via a rubber sheet 110. The oscillatory wave motor is constituted by a rotor 111, a stator 113 and a piezoelectric element 114. A dustproof collar 112 is provided to fix a rotational mounting position of the stator 113 and to reduce ingression of wear debris generated on a contact surface between the rotor 111 and the stator 113 toward the flexible printed wiring board. A pressurizer is constituted by a felt sheet 115, a spring washer 116 and a thrust washer 117. The pressurizer applies urging force along the optical axis to the components constituting the oscillatory wave motor such that the components are brought into contact with one another. With the urging force, the rotor 111 of the oscillatory wave motor is pressed against the rollers 105 via the rubber sheet 110 and the connection ring 109 which is formed integrally with the rotor 111.

Next, an operation of the focus driving unit 2A will be described.

In a motor-driven focus control in, for example, an auto focusing system, the oscillatory wave motor is driven in accordance with a control instruction from the camera body. The rollers 105 which the connection ring 109 disposed integrally with rotor 111 is in contact with are rotated by torque of the rotor 111 which is an output part of the oscillatory wave motor. At the same time, the roller support ring 104 which supports the rollers 105 is rotated about the optical axis in a forward direction at a reduction ratio of 1/2. The focus key 107, which is fixed to the roller support ring 104, engages with the second in-line guide barrel 211 such that the second lens unit L2 which is a focusing unit might be moved by the focus key 107. The position encoder constituted by the flexible printed wiring board and the brush member 108 detects an end of the operation area. It is therefore controlled that no excessive torque might be applied to the oscillatory wave motor.

Next, an operation following a manual operation of the focus ring 224 will be described.

As the focus ring 224 is rotated, torque is transferred to the manual connection ring 102 engaging therewith. At the same time, torque is transferred to the slip ring 103 which is disposed integrally with the manual connection ring 102. The slip ring 103 is pressed against the rollers 105. The oscillatory wave motor is disposed at the imaging surface side of the rollers 105. Accordingly, as the slip ring 103 is rotated about the optical axis, the rollers 105 are rotated and thus the roller support ring 104 supporting the rollers 105 are rotated in a forward direction. As the roller support ring 104 is rotated about the optical axis, the focus key 107 engages with and moves the second lens unit L2, which is the focusing unit, in the same manner as being driven by the oscillatory wave motor.

Next, an operation in which an operator tries to rotate the focus ring 224 after the roller support ring 104 is brought into contact with an end of a rotational area will be described. A slippage occurs between the manual connection ring 102 and the slip ring 103 before a slippage occurring between the slip ring 103 and the rollers 105. This is because frictional resistance between the manual connection ring 102 and the slip ring 103 is smaller than that between the slip ring 103 and the rollers 105. The slippage between the rollers 105 and the slip ring 103 which are in surface contact with each other can reduce an occurrence of undesired unusual noise.

Next, an operation in which the operator performs a zooming operation with the lens barrel (i.e., operates the zoom operation ring 219) will be described.

An operation of the zoom operation ring 219 causes the gear ring A 220 to rotate and thereby causes the gear unit 222 to rotate. Thus, the gear ring B 221 is rotated in a reverse direction. Torque of the gear ring B 221 is transferred to the cam barrel 208 via the zoom lever 223 as reverse torque with the rotation of the zoom operation ring 219. Since the cam follower B is fit into the slot formed inside the guide barrel 205, the cam barrel 208 rotates at a fixed position about the optical axis along the inner diameter of the guide barrel 205.

Since the cam follower C attached to the sub cam barrel 209 fitting into the cam barrel 208 is fit into the in-line slot of the cam barrel 208, the sub cam barrel 209 rotates in an amount equivalent to that of rotation of the cam barrel 208 as the cam barrel 208 rotates. Since the cam follower C attached to the sub cam barrel 209 is fit also into the cam slot of the guide barrel 205, the sub cam barrel 209 is moved back and forth along the cam slot of the guide barrel 205. Thus, the sub cam barrel 209 is extended while being rotated within the cam barrel 208.

Since the second in-line guide barrel 211 which is fit into the sub cam barrel 209 is fixed to the sub cam barrel 209 through a bayonet engagement, the second in-line guide barrel 211 tries to rotate in an amount equivalent to that of rotation of the sub cam barrel 209 due to the frictional force of the portion at which the second in-line guide barrel 211 and the sub cam barrel 209 are fit together. The focus key 107 of the focus driving unit 2A engages with the second in-line guide barrel 211. The focus key 107 of the focus driving unit 2A is fixed to the differential operating system within the focus driving unit 2A. The differential operating system is supported by friction. The focus key 107 may receive force from the second in-line guide barrel 211 in the rotational direction. Even in that case, since frictional support force of the differential operating system is larger than frictional support force between the sub cam barrel 209 and the second in-line guide barrel 211, the focus key 107 would not be rotated.

The cam follower D 213 of the second lens barrel 212 is made to pass through and supported by the focus cam slot formed in the sub cam barrel 209 and the in-line slot of the second in-line guide barrel 211. Thus, the second lens barrel 212 is moved linearly within the second in-line guide barrel 211.

Since the third in-line guide barrel 214 which is fit into the sub cam barrel 209 is fixed to the sub cam barrel 209 through a bayonet engagement, the third in-line guide barrel 214 tries to rotate in an amount equivalent to that of rotation of the sub cam barrel 209 due to the frictional force of the portion at which the third in-line guide barrel 214 and the sub cam barrel 209 are fit together. When the sub cam barrel 209 is extended while being rotated within the cam barrel 208, the third in-line guide barrel 214 tries to rotate interlockingly with the sub cam barrel 209 such that the sub cam barrel 209 might to be extended. The third in-line guide barrel 214 is moved linearly with the sub cam barrel 209 while rotation of the third in-line guide barrel 214 is restricted by the in-line guide key 216 which is fixed to the guide barrel 205.

The cam follower E of the third lens barrel 215 is made to pass through and supported by a third cam slot formed in the sub cam barrel 209 and through an in-line slot of the third in-line guide barrel 214. As the cam barrel 208 is rotated and the sub cam barrel 209 is rotated and extended, the cam follower E of the third lens barrel 215 is moved back and forth along the cam slot of the sub cam barrel 209. Thus, the third lens barrel 215 is moved, without rotation, along the optical axis in an amount greater than that of the movement of the sub cam barrel 209 along the optical axis.

In the fourth lens barrel 217, the cam follower F 218 which is fixed thereto with screws is made to pass through a fourth cam slot formed in the cam barrel 208 and through an in-line slot formed in the guide barrel 208. Thus, as the cam barrel 208 rotates, the cam follower F 218 of the fourth lens barrel 217 is moved along the fourth cam slot of the cam barrel 208. Since the cam follower F 218 is fit also into the in-line slot of the guide barrel 208, the cam follower F 218 is moved only along the optical axis without rotation. Thus, as the cam barrel 208 is rotated, the fourth lens barrel 217 is moved linearly back and forth within the cam barrel 208.

Accordingly, a focal length of the lens barrel is changed with the rotation of the zoom operation ring 219.

While a preferred embodiment of the present invention has been described, it is to be understood that the present invention is not limited thereto but may be changed or modified within the spirit and scope of the present invention.

For example, as described above, the manual connection ring 102 and the focus ring 224 are provided as separate parts for the ease of manufacture. However, these parts may be integrated without limiting the effect of the present invention. The collar member 101 may be formed as a sheet member with slidability. While the rollers 105 are disposed at three radial positions perpendicular to the optical axis and at equal intervals, four or more rollers 105 may be provided. Each of the rollers 105 may alternatively have two stepped diameters such that the slip ring 103 and the connection ring 109 are brought into contact with the rollers 105 at different diameter sections. With this, there is also an effect that the reduction ratio of the roller support ring 104 can be changed independently for the manual operation and for the motor-driven operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-289724 filed Dec. 21, 2009, which is hereby incorporated by reference herein in its entirety.

What is claimed is:

1. A lens barrel, comprising:
an annular oscillatory wave motor which drives a lens along an optical axis;
a manual ring which is rotatable about the optical axis of the lens and is operated manually to move the lens along the optical axis;
a slip ring which is rotatable about the optical axis and is in contact with the manual ring;
a roller which is rotatable about an axis in a radial direction perpendicular to the optical axis and is in contact with the slip ring;
a roller support ring which supports the roller and is rotatable about the optical axis;
a connection ring disposed between the roller and the annular oscillatory wave motor and configured to transmit a force from the annular oscillatory wave motor to the roller, wherein a rubber sheet is disposed between the connection ring and the annular oscillatory wave motor; and
a pressurizer which presses the oscillatory wave motor against the roller via the rubber sheet and the connection ring,
wherein frictional resistance on a contact surface between the manual ring and the slip ring is smaller than that on a contact surface between the roller and the slip ring.

2. The lens barrel according to claim 1, wherein:
the roller support ring includes a driving arm which engages, upon rotation, with a guide barrel that causes the lens to move along the optical axis; and
as the driving arm provided in the roller support ring is rotated about the optical axis by the annular oscillatory wave motor or the manual ring, the guide barrel is rotated to cause the lens to move along the optical axis.

3. A camera system comprising the lens barrel according to claim 1.

4. A lens barrel, comprising:
an annular oscillatory wave motor which drives a lens along an optical axis;
a manual ring which is rotatable about the optical axis of the lens and is operated manually to move the lens along the optical axis;
a slip ring which is rotatable about the optical axis and is in contact with the manual ring;
a roller which is rotatable about an axis in a radial direction perpendicular to the optical axis and is in contact with the slip ring;
a roller support ring which supports the roller and is rotatable about the optical axis; and
a connection ring disposed between the roller and the annular oscillatory wave motor and configured to transmit a force from the annular oscillatory wave motor to the roller, wherein a rubber sheet is disposed between the connection ring and the annular oscillatory wave motor; and
a pressurizer which presses the roller and the slip ring together by pressing the oscillatory wave motor against the roller via the rubber sheet and the connection ring,
wherein a contact surface between the manual ring and the slip ring and a contact surface between the roller and the slip ring are adapted such that a slippage might occur between the manual ring and the slip ring before a slippage occurring between the roller and the slip ring when the manual ring receives force in a predetermined rotational direction even after it is rotated in the predetermined rotational direction and is brought into contact with an end of a rotational area.

5. The lens barrel according to claim 4, wherein:
the roller support ring includes a driving arm which engages, upon rotation, with a guide barrel that causes the lens to move along the optical axis; and
as the driving arm provided in the roller support ring is rotated about the optical axis by the annular oscillatory wave motor or the manual ring, the guide barrel is rotated to cause the lens to move along the optical axis.

6. A camera system comprising the lens barrel according to claim 4.

7. The lens barrel according to claim 1, wherein the manual ring includes an operation ring to be rotated by a manual operation and a manual connection ring configured to transfer rotation of the operation ring to the slip ring.

8. The lens barrel according to claim 4, wherein the manual ring includes an operation ring to be rotated by a manual operation and a manual connection ring configured to transfer rotation of the operation ring to the slip ring.

9. A lens barrel, comprising:
an annular oscillatory wave motor which drives a lens along an optical axis;
a manual ring which is rotatable about the optical axis of the lens and is operated manually to move the lens along the optical axis;
a slip ring which is rotatable about the optical axis and is in contact with the manual ring;
a roller which is rotatable about an axis in a radial direction perpendicular to the optical axis and is in contact with the slip ring;
a roller support ring which supports the roller and is rotatable about the optical axis;
a connection ring disposed between the roller and the annular oscillatory wave motor and configured to transmit a force from the annular oscillatory wave motor to the roller, wherein an elastic member is disposed between the connection ring and the annular oscillatory wave motor; and
a pressurizer which presses the oscillatory wave motor against the roller via the elastic member and the connection ring,
wherein frictional resistance on a contact surface between the manual ring and the slip ring is smaller than that on a contact surface between the roller and the slip ring.

10. The lens barrel according to claim 9, wherein:
the roller support ring includes a driving arm which engages, upon rotation, with a guide barrel that causes the lens to move along the optical axis; and
as the driving arm provided in the roller support ring is rotated about the optical axis by the annular oscillatory wave motor or the manual ring, the guide barrel is rotated to cause the lens to move along the optical axis.

11. A camera system comprising the lens barrel according to claim 9.

12. A lens barrel, comprising:
an annular oscillatory wave motor which drives a lens along an optical axis;
a manual ring which is rotatable about the optical axis of the lens and is operated manually to move the lens along the optical axis;
a slip ring which is rotatable about the optical axis and is in contact with the manual ring;
a roller which is rotatable about an axis in a radial direction perpendicular to the optical axis and is in contact with the slip ring;
a roller support ring which supports the roller and is rotatable about the optical axis;
a connection ring disposed between the roller and the annular oscillatory wave motor and configured to transmit a force from the annular oscillatory wave motor to the roller, wherein an elastic member is disposed between the connection ring and the annular oscillatory wave motor; and
a pressurizer which presses the roller and the slip ring together by pressing the oscillatory wave motor against the roller via the elastic member and the connection ring,
wherein a contact surface between the manual ring and the slip ring and a contact surface between the roller and the slip ring are adapted such that a slippage might occur between the manual ring and the slip ring before a slippage occurring between the roller and the slip ring when the manual ring receives force in a predetermined rotational direction even after it is rotated in the predetermined rotational direction and is brought into contact with an end of a rotational area.

13. The lens barrel according to claim 12, wherein:
the roller support ring includes a driving arm which engages, upon rotation, with a guide barrel that causes the lens to move along the optical axis; and
as the driving arm provided in the roller support ring is rotated about the optical axis by the annular oscillatory wave motor or the manual ring, the guide barrel is rotated to cause the lens to move along the optical axis.

14. A camera system comprising the lens barrel according to claim 12.

15. The lens barrel according to claim 9, wherein the manual ring includes an operation ring to be rotated by a manual operation and a manual connection ring configured to transfer rotation of the operation ring to the slip ring.

16. The lens barrel according to claim 12, wherein the manual ring includes an operation ring to be rotated by a manual operation and a manual connection ring configured to transfer rotation of the operation ring to the slip ring.

* * * * *